(12) United States Patent  (10) Patent No.: US 7,044,254 B2
Graziano  (45) Date of Patent: May 16, 2006

(54) MOTORCYCLE FORWARD CONTROLS WITH PUSH PRESSURE ACTIVATION ONLY

(75) Inventor: Vincent Ricardo Graziano, N. Royalton, OH (US)

(73) Assignee: Vincent R. Graziano, N. Royalton, OH (US)

( * ) Notice: Subject to any disclaimer, the term of this patent is extended or adjusted under 35 U.S.C. 154(b) by 0 days.

(21) Appl. No.: 10/912,485

(22) Filed: Aug. 5, 2004

(65) Prior Publication Data
US 2006/0027410 A1  Feb. 9, 2006

(51) Int. Cl.
G05G 9/02 (2006.01)
(52) U.S. Cl. .......................... 180/219; 74/512
(58) Field of Classification Search ............... 180/219; 74/512, 513, 564
See application file for complete search history.

(56) References Cited

U.S. PATENT DOCUMENTS

| 1,675,551 | A | * | 7/1928 | Williams et al. ............ 280/301 |
| 4,061,051 | A | * | 12/1977 | Grandis .................... 74/473.16 |
| 4,608,879 | A | * | 9/1986 | Ishida et al. ............. 74/473.16 |
| 4,633,727 | A | | 1/1987 | Pike |
| 5,661,999 | A | | 9/1997 | Carone |
| 6,131,682 | A | | 10/2000 | Walker |
| 6,308,797 | B1 | * | 10/2001 | Hacker et al. .............. 180/230 |
| 6,394,214 | B1 | * | 5/2002 | Hahm ........................ 180/230 |

* cited by examiner

Primary Examiner—Kevin Hurley

(57) ABSTRACT

A motorcycle transmission shifter assembly that uses the bottom toe portion of the foot to shift a motorcycle into a lower or higher gear using a combination of two shift levers located at the front of the foot. This assembly is linked to the transmission by a long shift rod.

2 Claims, 4 Drawing Sheets

MOTORCYCLE FORWARD CONTROLS WITH PUSH PRESSURE ACTIVATION ONLY

FIELD OF THE INVENTION

This invention relates to motorcycles in general, but is aimed particularly to motorcycles having the shift controls in the forward position.

BACKGROUND OF THE INVENTION

Forward controls are common on motorcycles coming from the factory and also as an aftermarket application.

They will typically be mounted on the side of the motorcycle, usually the left side, and mounted directly to the frame or possibly the engine assembly.

The prior art assembly basically consists of a protruding footrest, commonly referred to as a footpeg.

The driver's foot rests on the footpeg when in the riding position and also while shifting gears.

Forward and slightly above the footpeg, there is a shift lever. The shift lever is used to shift the transmission into a lower or higher gear as necessary. The shift lever is connected to the transmission by a long rod, to be referred to as a shift rod, which moves forward or aft when the shift lever is activated. When the shift lever is depressed, it pulls the shift rod forward, actuating a mechanism in the transmission to change to a different gear, usually a lower gear, as when coming to a stop, commonly referred to as downshifting. When it is desirable to shift to a higher gear, commonly referred to as upshifting, the toe of the foot must be placed under the shift lever and pulled up, moving the shift rod rearward, activating the transmission to switch to a higher gear. This upward movement of the shift lever is repeated until desired gear is reached. The continued pulling up movement, over the course of a ride, can result in muscle fatigue, which can cause discomfort and possibly shortening said ride prematurely. Also with the prior art assembly, the repeated pulling up movement can eventually cause a wear mark to appear on top of the shoe or boot, thus ruining them.

SUMMARY OF THE INVENTION

The present invention provides an improved shift lever assembly where downward force of the bottom toe portion of the foot is not only used to shift the transmission into a lower gear, as when downshifting, but also to shift the transmission into a higher gear. More specifically, the invention provides a motorcycle shift lever assembly including a mounting plate, for attaching said invention to motorcycle, an outward protruding footpeg, two shift levers mounted in front and/or above said footpeg to be operated by the bottom toe portion of the foot, a pivot plate that moves forward and backwards when said shift levers are pushed, and a shift rod that, on one end attaches to said pivot plate and the other end to said transmission.

A further object to the present invention is to provide the said shift lever assembly with the option of attaching said shift rod to the lower or upper portion of said pivot plate which reverses the downshifting or upshifting role of said shift levers, as desired by the motorcycle driver.

A yet further object to the present invention is to provide an improved motorcycle shift lever assembly that can be installed on the bike at the motorcycle factory, either as standard equipment, or as an option.

A still further object to the present invention would be to have the said invention available as an aftermarket item to be installed at a later date.

Let it be understood that the details and illustrations have been described for the competence of disclosure, without intending to limit the scope of the invention which is set forth in the appended claims.

DETAILED DESCRIPTION OF THE PREFERRED EMBODIMENT

Figure 1:
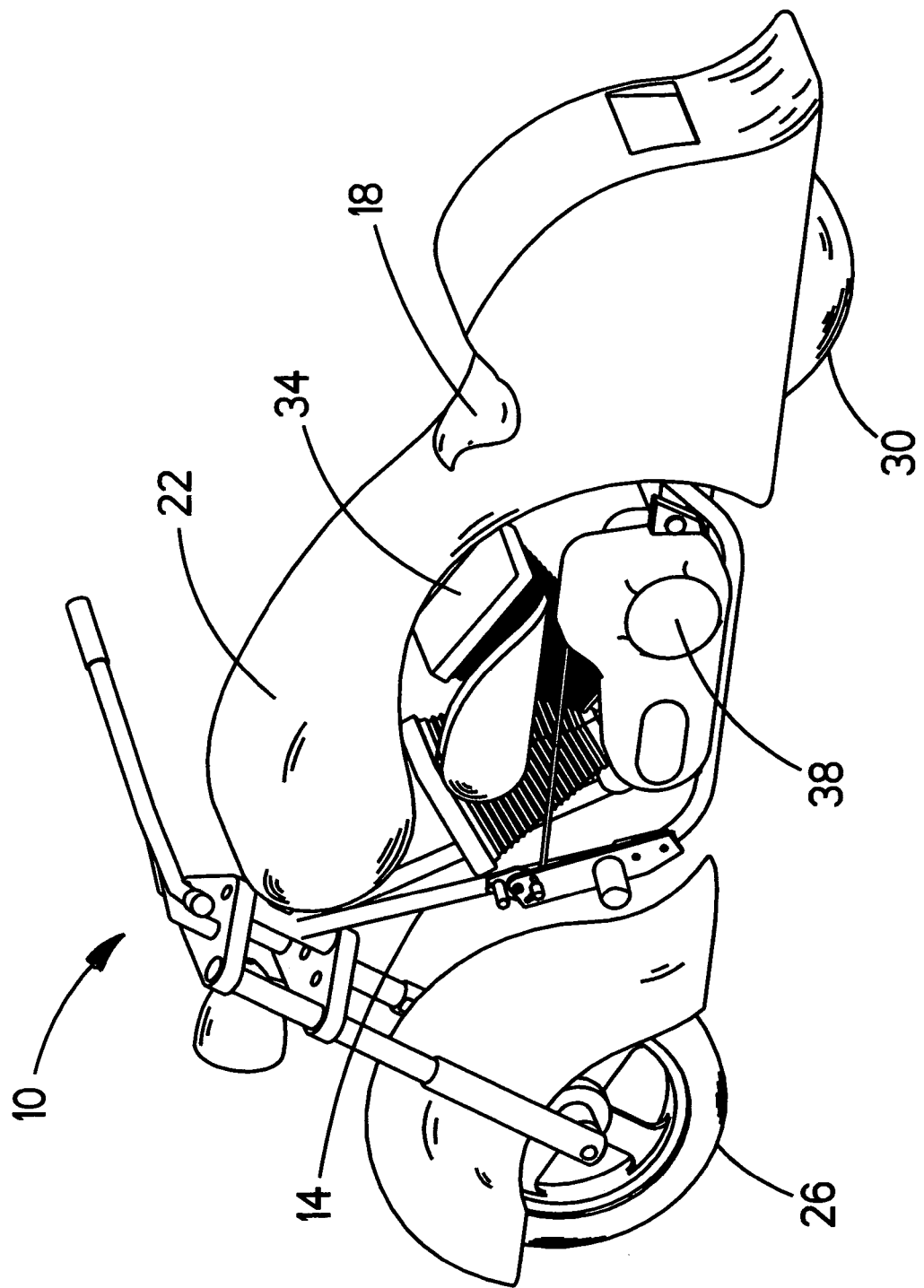
FIG. 1 is a left side view of a motorcycle having the present invention installed.
Figure 2:
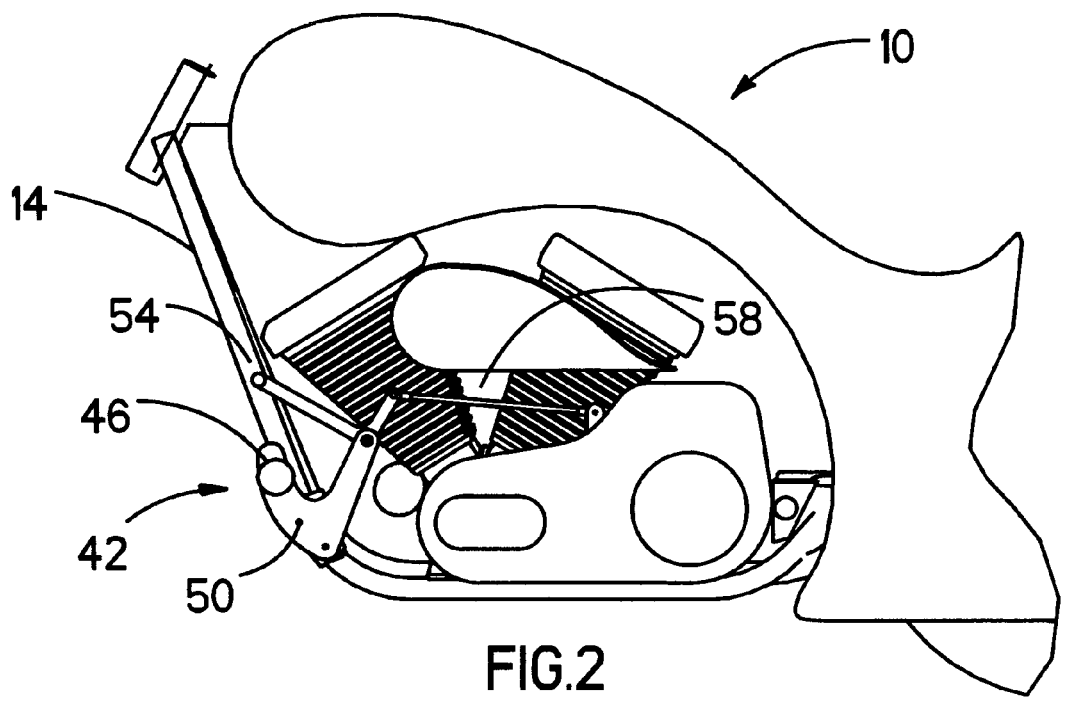
FIG. 2 is a left side close-up view of a prior art motorcycle shift lever assembly.

FIG. 1 illustrates a side view of a Motorcycle 10 embodying the present invention. The Motorcycle 10 generally consists of a Frame 14, a Seat 18, a Fuel Tank 22, a Front Wheel 26, and a Rear Wheel 30. Mounted within the frame would be an Engine 34, and a Transmission 38. FIG. 2 illustrates a side view close-up of Motorcycle 10, but with a conventional Shift Lever Assembly 42. The conventional Shift Lever Assembly 42 generally consists of a Footpeg 46, to rest the foot on, a Mounting Plate 50, bolted or clamped to the Frame 14, and a Shift Lever 54 which is depressed by the foot or pulled up by the foot for shifting the gears lower or higher. The Shift Lever 54 is connected to the Transmission 38 with a Shift Rod 58 which moves forward or rearward when the Shift Lever 54 is depressed or pulled up. This motion by the Shift Rod 58 is what activates the Transmission 38 to shift to another gear.

Figure 3:
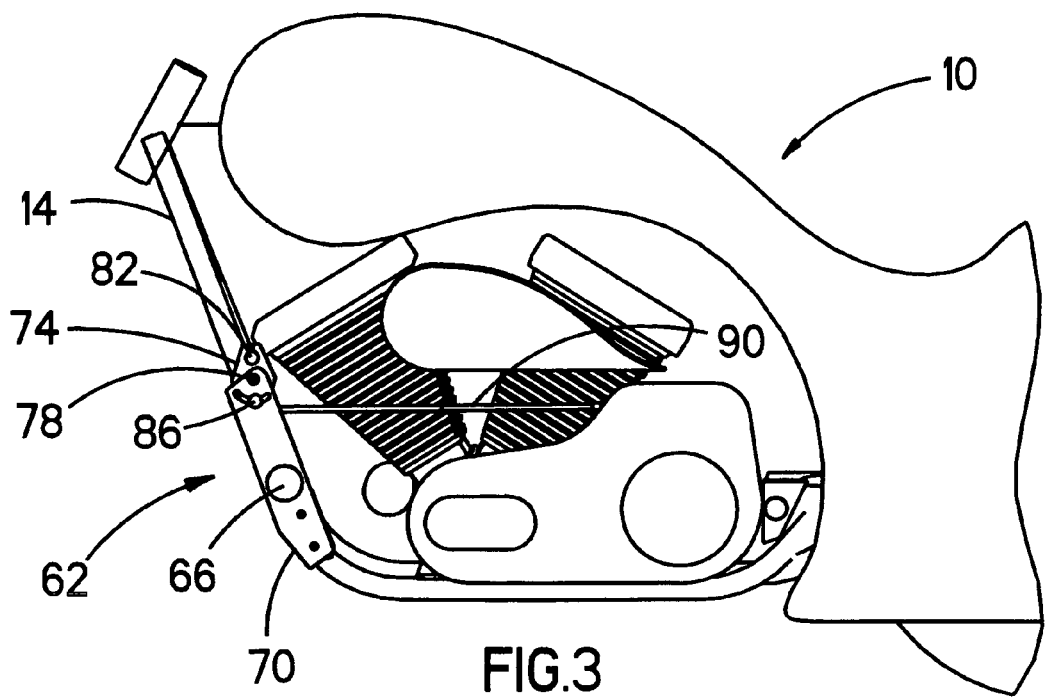
FIG. 3 is a left side close-up view of the present motorcycle shift lever invention in a neutral position.

FIG. 3 depicts a side view close-up of Motorcycle 10 with the present Invention 62 attached. The present invention consists of a Footpeg 66, a mounting plate 70 which is clamped or bolted to Frame 14, a Pivot Plate 74 mounted behind Mounting Plate 70 by a Pivot Bolt Assembly 78. The Pivot Bolt Assembly would generally be a typical nut and bolt assembly, or similar, which attaches the Pivot Plate 74 to the Mounting Plate 70 but allows Pivot Plate 74 to pivot freely. Attached to Pivot Plate 74 is an Upper Shift Rod 82 and a Lower Shift Rod 86. These shift rods could be of equal or different lengths and can also be formed in a variety of shapes or bends as necessary. Also attached to the Pivot Plate would be a Shift Rod 90 similar in appearance and function to Shift Rod 58 in prior art FIG. 2. Shift Rod 90 is depicted in all present invention views as being attached to the lower end of Pivot Plate 74 but in actuality, could be attached at the upper end of Pivot Plate 74, which would reverse the effects Shift Rods 82 and 86 have on said Transmission 38.

Figure 4:
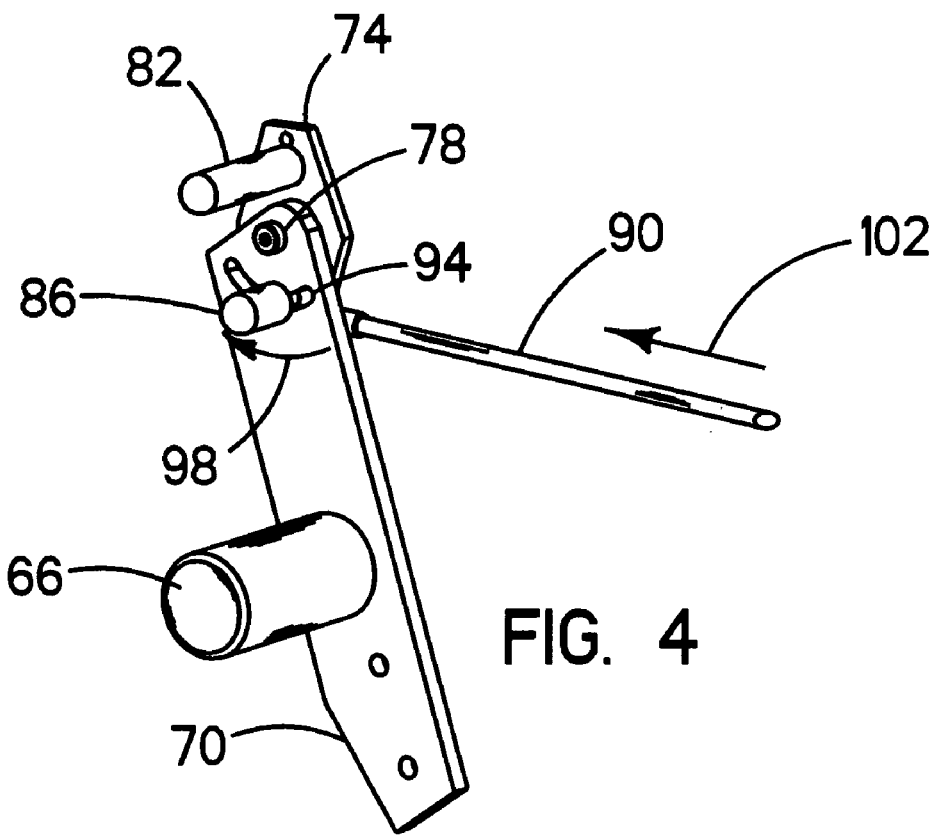
FIG. 4 is a left side elevational view of said present invention with the lower shift rod in the forward (downshift) position.

Referring to FIG. 4, we have a perspective view of the present Invention 62 with Lower Shift Rod pushed forward, in direction of Arrow 98. This forward pushing on Lower Shift Rod 86 pulls Shift Rod 90 forward, in direction of Arrow 102, actuating the Transmission 38, to shift gears.

Figure 5:
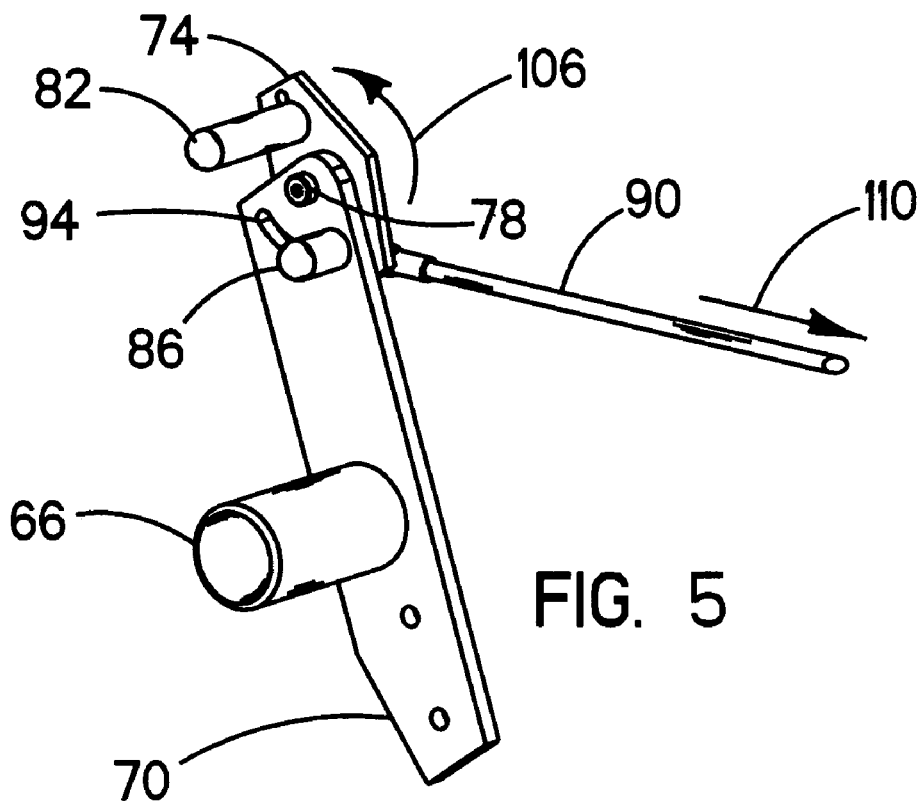
FIG. 5 is a left side elevational view of said present invention with the upper shift rod in the forward (upshift) position.

FIG. 5 depicts said perspective view of present Invention 62 but with the Upper Shift Rod 82 pushed forward in direction of Arrow 106, which pushes Shift Rod 90 rearward, in direction of Arrow 110, actuating Transmission 38 to change gears.

The perspective views of FIGS. 4 and 5 also illustrate the pivoting movement of Pivot Plate 74. These said views also depict a Slot 94 cut into Mounting Plate 70 to allow Lower Shift Rod 86 to protrude through from Pivot Plate 74 and move freely. Upper Shift Rod 82 requires no slotting of Mounting Plate 70, as it resides higher and out of the way of Mounting Plate 70.

However, if one were to desire a slot for Upper Shift Rod 82 to protrude through Mounting Plate 70 as a design option, this could be solved by having Mounting Plate 70 long enough to require a slot for Upper Shift Rod 82.

Figure 6:
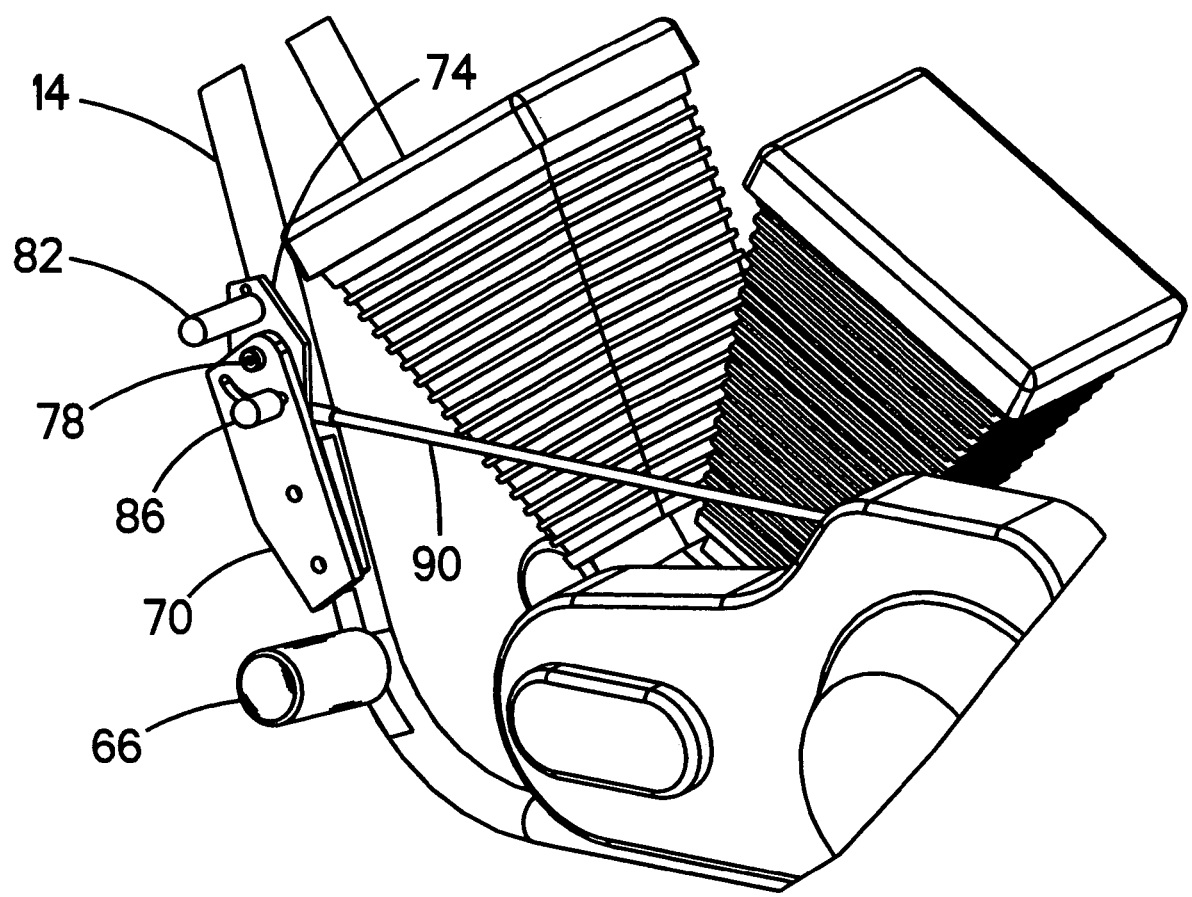
FIG. 6 is a left side elevational view of said present invention installed independent of footrest.

FIG. 6 depicts said perspective view of present Invention 62 mounted to frame 14 of motorcycle 10 but having footpeg 46 mounted to frame 14 separate.

In general, the present invention eliminates the need to pull upward with the foot for any part of the gear shifting operation and also keeps the shift assembly forward of the rider's foot, at the toes, for safety, convenience, and comfort.

Let it be understood that although specific embodiments of the invention have been described for purposes of illustration, various changes may be made in the form, construction, and arrangement of the parts without departing from the spirit and scope of the invention as defined by the following claims.

I claim:

1. A motorcycle shift lever assembly which is connected to a transmission of a motorcycle to shift the gears upward from a lower gear or downward from a higher gear, by using the bottom toe portion of the foot wherein said shift lever assembly comprises: a shift lever assembly mounting plate that is secured to the frame of said motorcycle; a footrest attached directly to the frame of the motorcycle, projecting outwardly from said motorcycle; a pivot plate with a centrally located attachment mounting hole to attach to said shift lever assembly mounting plate at a position above and/or in front of said footrest, with an attachment fastener which permits said pivot plate to pivot freely; a pair of shift rods attached at opposite ends of said pivot plate, with the pivot plate attachment point central between the shift rods; and a shift rod connecting at either end of said pivot plate and attached to said transmission.

2. A motorcycle shift lever assembly which is connected to a transmission of a motorcycle to shift the gears upward from a lower gear or downward from a higher gear, by using the bottom toe portion of the foot wherein said shift lever assembly comprises: a shift lever assembly mounting plate that is secured to the frame of said motorcycle; the shift lever assembly mounting plate including a slot therethrough; a footrest that attaches to said shift lever assembly mounting plate, projecting outwardly from said motorcycle; a pivot plate with a centrally located attachment mounting hole attached to said shift lever assembly mounting plate at a position above and/or in front of said footrest with an attachment fastener which permits said pivot plate to pivot freely; a pair of shift rods attached at opposite ends of said pivot plate, with the pivot plate attachment point central between the shift rods; and a shift rod connecting at either end of said pivot plate and attached to said transmission.

\* \* \* \* \*